(12) United States Patent
Hayakawa et al.

(10) Patent No.: US 7,649,717 B2
(45) Date of Patent: Jan. 19, 2010

(54) DATA STORAGE DEVICE WITH SUPPORT FOR WIRING STRUCTURE PORTION TO SUPPRESS FLUTTERING

(75) Inventors: Satoshi Hayakawa, Kanagawa (JP); Kohichi Takeuchi, Kanagawa (JP); Takeshi Chawanya, Kanagawa (JP); Eiji Soga, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 605 days.

(21) Appl. No.: 11/029,265

(22) Filed: Jan. 4, 2005

(65) Prior Publication Data

US 2005/0152071 A1     Jul. 14, 2005

(30) Foreign Application Priority Data

Jan. 14, 2004  (JP) .............................. 2004-007171

(51) Int. Cl.
*G11B 21/08*  (2006.01)
*G11B 33/08*  (2006.01)
*G11B 5/55*  (2006.01)

(52) U.S. Cl. ................................................ 360/264.2
(58) Field of Classification Search .............. 360/245.8, 360/245.9, 246, 264.2, 266.3
See application file for complete search history.

(56) References Cited

U.S. PATENT DOCUMENTS

| | | | | |
|---|---|---|---|---|
| 5,644,448 A | * | 7/1997 | Suzuki | .................... 360/264.2 |
| 5,668,684 A | * | 9/1997 | Palmer et al. | ............ 360/264.2 |
| 5,949,618 A | * | 9/1999 | Arya et al. | ................ 360/264.2 |
| 5,978,177 A | * | 11/1999 | Takasugi | .................. 360/245.9 |
| 5,999,375 A | | 12/1999 | Forbord et al. | |
| 6,212,046 B1 | * | 4/2001 | Albrecht et al. | .......... 360/264.2 |
| 6,366,432 B1 | * | 4/2002 | Tadepalli et al. | ......... 360/264.2 |
| 2003/0123194 A1 | * | 7/2003 | Korkowski et al. | ....... 360/245.9 |
| 2003/0161074 A1 | | 8/2003 | Horie et al. | |

FOREIGN PATENT DOCUMENTS

JP    09-320213 A    12/1997

* cited by examiner

*Primary Examiner*—Craig A Renner
(74) *Attorney, Agent, or Firm*—Townsend and Townsend and Crew LLP (57) ABSTRACT

Embodiments suppress a fluttering phenomenon of a wiring structure portion for signal transmission between a head and an FPC. In one embodiment, an actuator has a support portion which accommodates a wiring structure portion. The wiring structure portion is provided at a rear end portion thereof with a wide tab, the tab having pads for connection with the FPC. The support portion has a convex wall portion formed so as to overlap a front end portion of the tab. An air current occurs at an end portion of a magnetic disk in the vertical direction. When the head accesses a track present on the inner periphery side of the magnetic disk, the tab approaches the disk end portion. Since the convex wall portion protects the tab against the air current, it is possible to suppress fluttering of the wiring structure portion and improve the head positioning accuracy.

15 Claims, 7 Drawing Sheets

DATA STORAGE DEVICE WITH SUPPORT FOR WIRING STRUCTURE PORTION TO SUPPRESS FLUTTERING

CROSS-REFERENCES TO RELATED APPLICATIONS

This application claims priority from Japanese Patent Application No. JP 2004-7171, filed Jan. 14, 2004, the entire disclosure of which is incorporated herein by reference.

BACKGROUND OF THE INVENTION

The present invention relates to a data storage device and more particularly to a data storage device having a support portion for supporting a wiring structure portion which is adapted to perform the transmission of a head signal.

A data storage device is known which uses various media, including an optical disk and a magnetic tape. Above all, a hard disk drive is spread widely as a storage device in a computer and is one of storage devices essential to computer system available at present. The application there is not limited to computer systems. Hard disk drives are used, for example, in moving image storage/reproduction apparatus, car navigation systems, and removable memories for use in digital cameras. Thus, the use of the hard disk drive is spreading more and more because of excellent characteristics thereof.

The hard disk drive includes a magnetic disk for the storage of data, a head for read and/or write of data from and/or to the magnetic disk, and an actuator for moving the head to a desired position above the magnetic disk. The actuator is moved pivotally about a pivot shaft by means of a voice coil motor, thereby causing the head to move radially over the magnetic disk which is rotating. As a result, the head can access a desired track formed on the magnetic disk and perform data read/write processing. The head has a write element which converts an electric signal into a magnetic field in accordance with data to be stored to the magnetic disk and/or a read element which converts a magnetic field induced from the magnetic disk into an electric signal. The head is further provided with a slider on a surface of which is (are) formed the write element and/or the read element.

The actuator is provided with a suspension having elasticity, and the head is fixed to the suspension. Pressure induced by the viscosity of air present between an ABS (Air Bearing Surface) of the head facing the magnetic disk and the magnetic disk which is rotating balances with pressure which is applied toward the magnetic disk by the suspension, whereby the head can float over the magnetic disk with a certain gap. The suspension includes gimbals which holds the head on its side facing the magnetic disk and a load beam which holds the gimbals on its side facing the magnetic disk. The gimbals is formed deformably so that the slider can tilt in a predetermined direction to absorb axial run-out or the like of the magnetic disk.

A relay wiring for signal transmission between a control circuit and elements on the head is formed on the actuator. The relay wiring is connected to an FPC (Flexible Printed Circuit) which is fixed to the actuator and which is for connection with the control circuit. For example, Japanese Patent Laid Open No. 09-320213 discloses that a part of a relay wiring is inserted into a groove formed in an arm portion of an actuator in order to improve the working efficiency of an actuator manufacturing process. A part of the relay wiring is constituted as wiring printed on the suspension which holds the head. One end of the wiring is connected to a terminal on the head, while an opposite end thereof is connected through an elongated relay FPC to a control-side FPC which is fixed to the actuator. The relay FPC which connects the wiring printed on the suspension with the control-side FPC is inserted into a groove formed in a side face of an arm portion of the actuator. According to this construction, wiring between the suspension with a wiring pattern pre-formed thereon and the FPC fixed to the actuator, as well as repair thereof, can be done easily in a short time.

Figure 11:
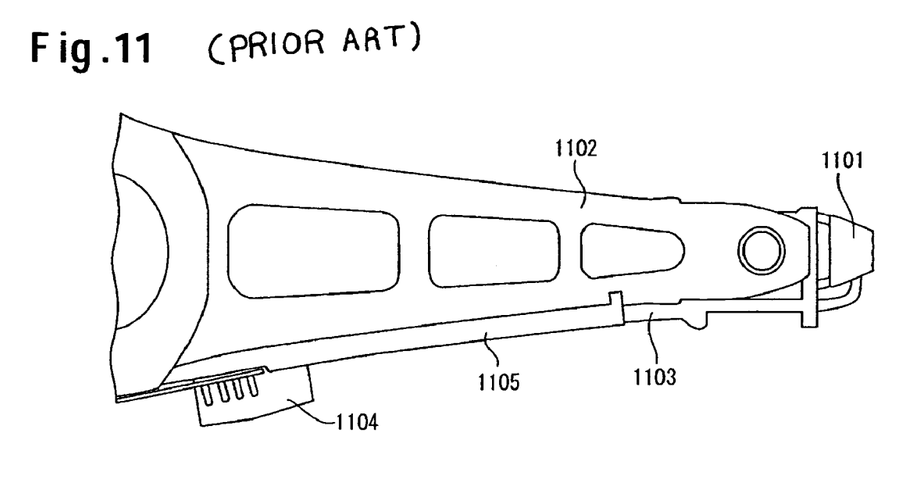
FIG. 11 is a plan view showing the construction an actuator in the prior art.

FIG. 11 is a plan view showing a partial construction of an actuator according to another approach. In the same figure, the numeral 1101 denotes a suspension which holds a head, numeral 1102 denotes an arm to which the suspension 1101 is connected. Typically, the actuator is provided with a plurality of stacked suspensions and arms, but in FIG. 11 there are shown one suspension 1101 and one arm 1102. Numeral 1103 denotes a wiring structure portion formed with a relay wiring for signal transmission between the head and an FPC which is fixed to the actuator. The wiring structure portion 1103 is formed integrally with gimbals which is a constituent of the suspension 1101, and a multi-layer structure consisting of insulating films and metallic wiring lines is formed on a metallic member. The wiring structure portion 1103 is formed with a wide tab 1104 at a side end portion of FPC. Plural pads which permit connection to FPC by soldering are formed on the tab.

Numeral 1105 denotes a support portion which supports the wiring structure portion extending from the suspension. Since the wiring structure portion 1103 is of a thin stacked structure as noted above, it is easily affected by an air current created with rotation of a magnetic disk. Once the wiring structure portion is fluttered (fluttering phenomenon) by the air current, the resulting oscillation is transmitted to the head, causing the positioning accuracy to be deteriorated. In a side portion of the support portion 1105 is formed a slit (concave portion) (not shown) and the wiring structure portion 1103 is accommodated and fixed within the slit.

Since the wiring structure portion is accommodated within the slit, the air current created over the magnetic disk with rotation of the disk can be prevented from striking against the wiring structure portion 1103. Consequently, it is possible to suppress the occurrence of fluttering phenomenon of the wiring structure portion 1103 and improve the positioning accuracy of the head. The support portion 1105 is formed of resin for example and is fixed to the arm 1102. Alternatively, as described above, the support portion 1105 may be substituted by a slit formed in a side portion of the arm 1102 and the wiring structure portion 1103 may be inserted into the slit, whereby it is possible to suppress the occurrence of fluttering phenomenon of the wiring structure portion 1103.

BRIEF SUMMARY OF THE INVENTION

As described above, to suppress the fluttering phenomenon of the wiring structure portion which is induced by an air current created with rotation of the magnetic disk, it is effective to adopt the construction wherein the wiring structure support portion having a slit structure for insertion therein of the wiring structure portion is added to the actuator, or a slit is formed in the arm portion of the actuator. However, the present inventors found out that in the hard disk drive having a tendency to a shorter track pitch, the above slit structure for suppressing the air current created over the magnetic disk could not fully prevent the fluttering phenomenon of the wiring structure portion. According to studies made by the present inventors, it was found that the air current created over the magnetic disk with rotation of the disk is not the only cause of occurrence of the fluttering phenomenon of the wiring structure portion.

With rotation of the magnetic disk, in addition to the air current created over the magnetic disk, an air current also occurs vertically (in the direction of a rotation axis of the magnetic disk) at an end portion of the disk. In the case where plural magnetic disks are stacked, air currents in the circumferential direction over the magnetic disks are not uniform and air currents created above and below each magnetic disk are not the same. Consequently, a pressure difference occurs between above and below of each magnetic disk, and an air current curvedly flowing in between above and below of each magnetic disk is induced.

As shown in FIG. 11, a wide tab 1104 for connection with FPC is formed at an FPC-side end portion of the wiring structure portion 1103. When the actuator accesses an inner periphery-side track of the magnetic disk, the tab 1104 approaches an end portion of the magnetic disk. In the actuator shown in FIG. 11, the tab 104 is exposed without being covered with the support portion 1105. The present inventors found out that this was the reason why the tab 1104 was largely oscillated by the vertical air current created at an end portion of the magnetic disk. In particular, since an aperture to be used for positioning in fabricating the suspension is formed in the tab 1104, the tab is further influenced largely by a vertical air current passing through the aperture, resulting in a marked fluttering phenomenon of the wiring structure portion.

It is a feature of the present invention to improve the positioning accuracy of a head at the time of access to a disk. It is another feature of the present invention to suppress the occurrence of fluttering of the wiring structure portion effectively. It is a further feature of the present invention to provide a simple structure for suppressing the occurrence of fluttering of the wiring structure portion effectively. It is a still further feature of the present invention to suppress the influence of an air current at an end portion of a rotating disk effectively.

The present invention, in a first aspect thereof, resides in a data storage device comprising a storage disk which stores data and which is rotatable, a head adapted to access a storage area of the storage disk, and an actuator adapted to hold the head and pivot about a pivot shaft for moving the head. The actuator comprises a wiring structure portion extending along a side portion of the actuator and adapted to perform signal transmission for the head and a wiring structure support portion disposed in the side portion of the actuator so as to support the wiring structure portion. The wiring structure portion has a convex portion formed on the pivot shaft side and projecting sideways of the actuator. The wiring structure support portion has a convex wall portion projecting sideways of the actuator and overlapping the convex portion so as to protect the convex portion from an air current in the vicinity of an end portion of the magnetic disk. Since the convex portion is protected by the convex wall portion from an air current created with rotation of the magnetic disk, it is possible to suppress the occurrence of fluttering of the wiring structure portion effectively.

In some embodiments, the wiring structure support portion has a first wall portion projecting sideways of the actuator and formed along the side portion of the actuator and a second wall portion projecting sideways of the actuator and formed along the side portion of the actuator, and the wiring structure portion is disposed between the first and second wall portions. According to this construction, the occurrence of fluttering of the wiring structure portion can be suppressed more effectively. The convex wall portion may be formed in the first wall portion and the width of the convex wall portion in the transverse direction of the actuator is larger than the width of the other portion of the first wall portion in the transverse direction of the actuator.

In some embodiments, the convex wall portion is formed in the first wall portion and the first wall portion has a plurality of concave portions formed spacedly. This construction is suitable to the case where the wiring structure support portion is formed by resin molding for example. Further, it is preferable that, in the first wall portion, the concave portion adjacent to the convex wall portion on a front side of the actuator be formed at a predetermined spacing from the convex wall portion.

In specific embodiments, the data storage device further comprises a second wiring structure portion connected to the wiring structure portion in the convex portion, the convex portion has a connecting portion connected to the second wiring structure portion, and the connecting portion is exposed to the outside of the convex wall portion. This construction permits connection of the wiring structure portion efficiently. Preferably, the connecting portion is connected by laser welding and the convex wall portion is formed in a color which substantially reflects and/or transmits a laser beam used in the laser welding. According to this construction, it is possible to suppress melting of the wiring structure support portion caused by laser welding.

In further embodiments, the data storage device comprises a second wiring structure portion connected to the wiring structure portion, the convex portion has a connecting portion connected to the second wiring structure portion, and the convex wall portion is transparent or white. According to this construction, it is possible to suppress melting of the wiring structure support portion caused through the radiation of a laser beam. From the standpoint of protecting the convex portion effectively, it is preferable that the convex portion be provided with an aperture and that the convex wall portion be formed so as to overlap the said aperture. Alternatively, the convex wall portion may overlap a front end portion of the convex portion. In still another embodiment, in the portion where the convex wall portion and the convex portion overlap each other, the width of the convex wall portion in the transverse direction of the actuator be larger than the width of the convex portion in the same direction.

In accordance with a second aspect of the present invention, there is provided a data storage device comprising a storage disk which stores data and which is rotatable, a head adapted to access a storage area of the storage disk, a suspension which holds the head, an arm connected to the suspension, a drive mechanism for pivoting the arm and the suspension, a wiring structure portion for performing signal transmission for the head, the wiring structure portion being formed contiguously to the suspension and extending toward the drive mechanism side along a side portion of the arm, a wiring structure support portion disposed in the side portion of the arm, and a second wiring structure portion connected to the wiring structure portion on the drive mechanism side. The wiring structure support portion comprises a first wall portion projecting sideways of the arm and formed along the side portion of the arm and a second wall portion projecting sideways of the arm and formed along the side portion of the arm. The wiring structure portion is disposed between the first and second wall portions. The wiring structure portion has a convex portion projecting sideways of the arm and connected to the second wiring structure portion. The first wall portion has a convex wall portion which overlaps the convex portion on the side facing the magnetic disk. Since the convex portion is protected by the convex wall portion from an air current created with rotation of the magnetic disk, it is possible to suppress the occurrence of fluttering of the wiring structure portion effectively.

In some embodiments, the convex portion has a connecting portion connected to the second wiring structure portion, and the connecting portion is exposed to the outside of the convex wall portion. The wiring structure support portion may be formed of a transparent or white resin.

In accordance with a third aspect of the present invention, there is provided a data storage device comprising a storage disk which stores data and which is rotatable, a head adapted to access a storage area of the storage disk, and an actuator adapted to hold the head and pivot about a pivot shaft for moving the head. The actuator comprises a wiring structure portion extending along a side portion of the actuator and adapted to perform signal transmission for the head, a second wiring structure portion connected to a connecting portion of the wiring structure portion on the pivot shaft side, and a wiring structure support portion disposed in the side portion of the actuator, the wiring structure support portion having a slit for receiving the wiring structure portion therein and being transparent or white in its portion located closed to the connecting portion. According to this construction, it is possible to suppress melting of the wiring structure support portion caused by laser welding. It is preferable that the wiring structure support portion be formed of a colored, transparent resin, whereby it becomes easier to check the position of the wiring structure portion and hence it is possible to improve the working efficiency in the manufacturing process.

In accordance with a fourth aspect of the present invention, there is provided a data storage device comprising a storage disk which stores data and which is rotatable, a head adapted to access a storage area of the storage disk, an actuator adapted to hold the head and pivot about a pivot shaft for moving the head, a wiring structure portion extending along a side portion of the actuator and adapted to perform signal transmission for the head, a second wiring structure portion connected to a connecting portion of the wiring structure portion on the pivot shaft side through radiation of a laser beam, and a wiring structure support portion disposed in the side portion of the actuator. The wiring structure support portion has a slit for receiving the wiring structure portion therein and its portion located near the connecting portion is formed of resin which substantially reflects or transmits the laser beam used in the laser beam radiation. According to this construction, it is possible to suppress melting of the wiring structure support portion caused by laser beam radiation. It is preferable that the wiring structure support portion be formed of a colored, transparent resin, whereby it becomes easier to check the position of the wiring structure portion and hence the working efficiency in the manufacturing process can be improved.

According to embodiments of the present invention it is possible to suppress the occurrence of fluttering of the wiring structure portion effectively.

DETAILED DESCRIPTION OF THE INVENTION

An embodiment to which the present invention is applicable will be described hereinbelow. The following description is for explaining the embodiment, and the present invention is not limited to the following embodiment. For the clarification of explanation, the following description and the accompanying drawings are partially omitted and simplified at appropriate portions. It is possible for any person skilled in the art to easily make changes, additions and conversions within the scope of the present invention with respect to components involved in the following embodiment. In the drawings, the same components are identified by the same reference numerals, and for the clarification of explanation, tautological explanations of components will be omitted as necessary.

Figure 1:
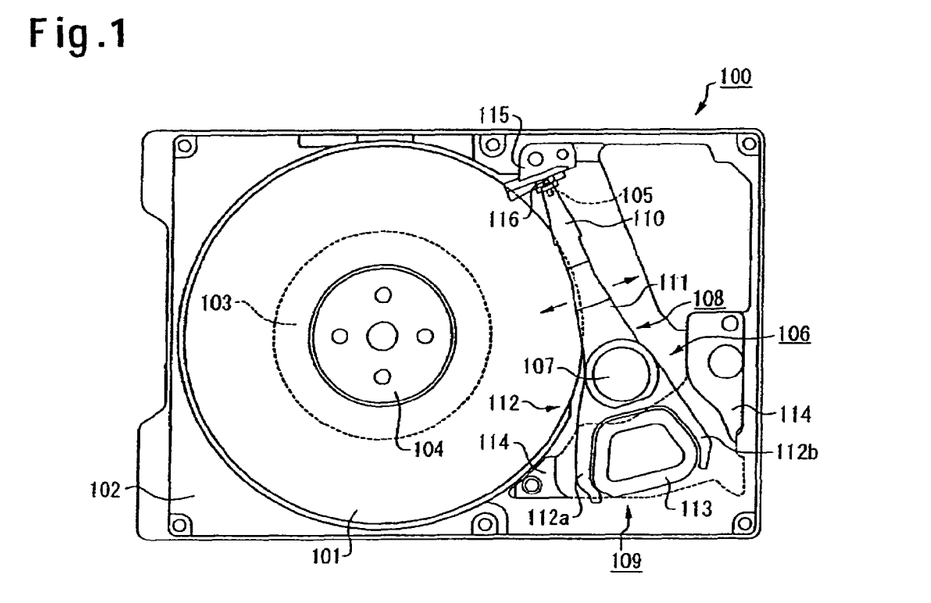
FIG. 1 is a plan view showing a schematic construction of a hard disk drive according to an embodiment of the present invention.

FIG. 1 is a top view showing a schematic construction of a hard disk drive 100 embodying the present invention. In the same figure, the numeral 101 denotes a data storage medium. The data storage medium 101 is a non-volatile magnetic storage disk in which data are stored by magnetization of a magnetic layer. Numeral 102 denotes a base for accommodating various components of the hard disk drive 100 therein. The base 102 is fixed through a gasket (not shown) to a cover (not shown) which closes an upper opening of the base, thereby constituting disk enclosure. Thus, various components of the hard disk drive 100 can be accommodated in a hermetically sealed state within the disk enclosure.

Numeral 103 denotes a hub provided for a spindle motor 104. Numeral 105 denotes a head which performs write and/or read to and/or from the magnetic disk 101 with respect to input/output data delivered between the head and a host (not shown). The head 105 has a write element which converts an electric signal into a magnetic field in accordance with data to be stored to the magnetic disk 101 and/or a read element which converts a magnetic field induced from the magnetic disk 101 into an electric signal. The head 105 is further provided with a slider on a surface of which are (is) formed the write element and/or the read element.

Numeral 106 denotes an actuator which holds and moves the head 105. The actuator 106 is held pivotably by a pivot shaft 107 and includes a carriage 108 and a VCM (voice coil motor) 109. The carriage 108 includes such components as suspensions 110, suspension arms 111 and coil support 112 which are connected successively from a tip, or distal end, of the carriage where the head 105 is disposed. The construction of the carriage 108 will be described in detail later. The actuator 106, the carriage 108 and the components thereof will be described below, assuming that the tip, or distal, end side is a front side and the pivot shaft 107 side is a rear side.

Numeral 113 denotes a flat coil and numeral 114 denotes an upper stator magnet holding plate fixed to the base 102. The upper stator magnet holding plate 114 is illustrated in a state in which its principal portion is cut away for convenience sake and its contour is illustrated with a broken line. Though not shown, a lower stator magnet holding plate is disposed below the flat coil 113 so as to sandwich the flat coil 113 between the lower stator magnet holding plate and the upper stator magnet holding plate 114. The VCM 109 includes the flat coil 113, a stator magnet (not shown) fixed to the upper stator magnet holding plate 114, and a stator magnet (not shown) fixed to the lower stator magnet holding plate. Numeral 115 denotes a ramp mechanism for allowing the head 105 to be retracted thereto from the magnetic disk 101 when the disk stops rotation. Numeral 116 denotes a tab formed at a tip, or distal, end of the suspension 110. Numeral 116 denotes a tab formed on the tip of the suspension 110. The actuator 106 used in this embodiment is also applicable to CSS (Contact Start and Stop) system in which when the head 105 does not perform write and/or read of data, it is retracted to a zone located on the inner periphery side of the magnetic disk 101.

Though not clearly shown in FIG. 1, the hard disk drive 100 is provided with a plurality of stacked magnetic disks 101. With the hub 103, plural magnetic disks 101 are integrally held at predetermined spacings in the rotational axis direction of the spindle motor 104. Typically, data are stored on both sides of each magnetic disk. The actuator 106 is provided with heads 105 and suspensions 110 associated with the storage surfaces of the magnetic disks 101. Further, the actuator 106 is provided with plural arms 111 to each of which is (are) connected one or two suspensions 110. The suspensions 110 and the arms 111 are stacked at predetermined spacings and the arms 111 are fixed to a single coil support 112 through a pivot shaft bearing.

Each magnetic disk 101 is held integrally by the hub 103 of the spindle motor 104 which is fixed to the bottom of the base 102, and is rotated at a predetermined speed by the spindle motor 104. When the hard disk drive 100 is OFF, the magnetic disk 101 is at standstill. The coil support 112 held pivotably by the pivot shaft 107 is formed with coil support arms 112a and 112b. The coil support arms 112a and 112b hold the flat coils 113 on the side opposite the head arm 111 with respect to the pivot shaft 107. In accordance with a drive signal flowing from a controller (not shown) to the flat coil 113 the VCM 109 causes the carriage 108 to pivot about the pivot shaft 107, allowing the head 105 to move onto the magnetic disk 101. Alternatively, the head 105 can be moved to the outside of the magnetic disk 101.

To read data from or write data to the magnetic disk 101, the actuator 106 causes the head 106 to move to a position above the data area on the surface of the magnetic disk 101 which is rotating. With pivotal movement of the actuator, the head 105 moves radially of the surface of the magnetic disk 101, whereby the head can access a desired track. Pressure induced by the viscosity of air present between ABS (Air Bearing Surface) of the slider facing the magnetic disk 101 and the magnetic disk 101 which is rotating balances with pressure which is applied toward the magnetic disk 101 by the suspension 110, whereby the head 105 floats over the magnetic disk through a certain gap.

When the rotation of the magnetic disk 101 stops, the actuator 106 causes the head 105 to retract from the data area to the ramp mechanism 115. The actuator 106 moves pivotally toward the ramp mechanism 115 and the tab 116 at the tip of the actuator moves while sliding on the ramp mechanism 115 and gets on a parking surface on the ramp mechanism 115, whereby the head 105 is unloaded. At the time of loading, the actuator 106 which has been supported on the parking surface leaves the ramp mechanism 115 and moves to a position above the surface of the magnetic disk 101.

Figure 2:
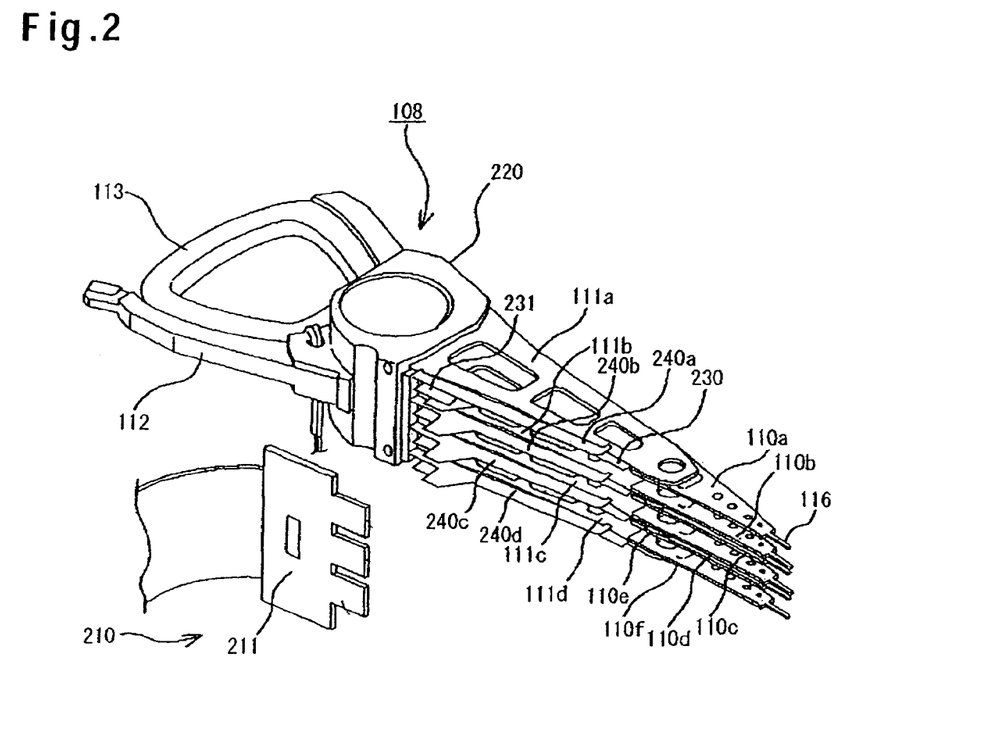
FIG. 2 is a perspective view explaining the construction of an actuator used in the embodiment.

FIG. 2 is a perspective view of the carriage 108 used in this embodiment and an FPC (Flexible Printed Circuit) 210 connected to the carriage 108. The carriage 108 illustrated in FIG. 2 has a construction used for three magnetic disks 101 each having both sides as data storage surfaces. The carriage 108 has four stacked arms 111a to 111d and six stacked suspensions 110a to 110f. The head 105 (not shown) is fixed to each suspension 110. The top and bottom arms 111a, 111d are fixed to the suspensions 110a and 110f, respectively, that is, each of the top and bottom arms is fixed to one suspension 110a (110f).

Two suspensions 110 are fixed to each of intermediate arms 111b and 111c. More specifically, suspensions 110b and 110c are fixed respectively to both sides of the arm 111b, while suspensions 110d and 110e are fixed respectively to both sides of the arm 111c. The arms 111 and the suspensions 110 can be connected together by laser spot welding or by swaging. The plural arms 111a to 111d are stackedly fixed to a pivot shaft bearing 220. On the side opposite the arms 111, the coil support 112 and the flat coil 113 are fixed to the pivot shaft bearing 220.

Numeral 230 denotes a wiring structure portion extending from the suspension 110. In FIG. 2, only the wiring structure portion extending from the suspension 110a is shown as an example. The wiring structure portion 230 has a conductor wiring and is connected to a conductor wiring which is formed on the suspension 110 and which is connected to the write element and/or the read element on the head 105. At an opposite end of the wiring structure portion on the pivot shaft 107 side there is formed a tab 231 as a convex wall portion projecting sideways of the actuator. Plural pads which constitute connections for connection with the FPC 210 are formed on the tab 231.

In the FPC 210, plural conductor leads are formed, without mutual contact, integrally with an insulating sheet formed by a polyimide sheet. The FPC 210 is connected to the wiring structure portion 230 for signal transmission between the head 105 and a control circuit (not shown). An end portion of the FPC 210 is fixed onto a base plate 211 which is fixed to the actuator 106. Plural convex portions 212 are formed at the actuator 106-side end portion of the FPC base plate 211. Plural pads which constitute connections for connection with the wiring structure portion 230 are formed on surfaces of the convex portions 212. The pads formed on the convex portion 212 and the pads formed on the tab 231 of the wiring structure portion 230 are connected together by soldering to constitute connections. The plural arms 111a to 111d are respectively formed with support portions 240a to 240d for accommodating and supporting the wiring structure portions 230 extending from the suspensions 110. In this embodiment, the support portion 240 is formed separately from the arm 111 and is fixed to the arm 111. A detailed description of the wiring structure portion 230 and the support portion 240 will be given later.

Figure 3:
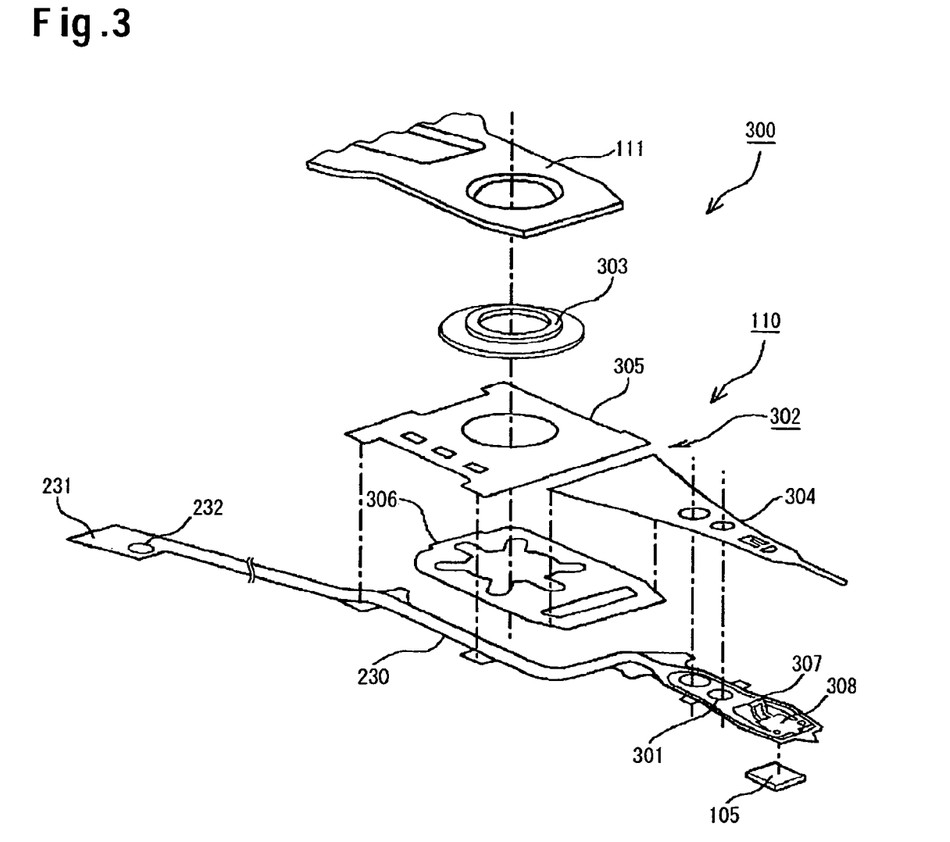
FIG. 3 is an exploded perspective view showing a schematic construction of a head gimbals assembly used in the embodiment.

FIG. 3 is an exploded perspective view showing a schematic construction of a head gimbals assembly 300. In this embodiment, the head gimbals assembly 300 is constituted by plural components and includes a head 105, a suspension 110 and an arm 111. The suspension 110 is constituted by plural components and includes gimbals 301, a load beam 302 and a mounting plate 303. The load beam 302 is a multi-piece type constituted by plural components and is made up of a beam portion 304, a base portion 305 and a hinge portion 306.

Each constituent element may be constituted by plural components or one component. The actuator 106 is provided with a plurality of stacked head gimbals assemblies 300 and the construction shown in FIG. 3 corresponds to the construction of the top or bottom head gimbals assembly. In each intermediate head gimbals assembly, suspensions 110 with heads 105 fixed thereto are connected respectively to upper and lower surfaces of the associated arm 111.

The arm 111 is typically formed of stainless steel or aluminum and required portions, including an aperture for insertion therein of the pivot shaft 107, are formed in the arm by etching. The load beam 302 is fixed onto the surface of the arm 111 on the side facing the magnetic disk 101. The hinge portion 306 has a spring function of creating a negative pressure resistant to the buoyancy which the head 105 undergoes from an air current developed with rotation of the magnetic disk 101. The beam portion 304 has rigidity for supporting the gimbals in a stable posture when the actuator 106 pivots. The base portion 305 has strength for fixing the load beam 302 to the arm 111. The base portion 305 and the arm 111 are connected to the mounting plate 303 by swaging or by laser spot welding. The hinge portion 306 is connected to the beam portion 304 and the base portion 305 by laser spot welding or with use of an adhesive.

The gimbals 301 may be formed of stainless steel and has a desired elasticity. The gimbals 301 is provided with a gimbals tongue 308 in a front portion thereof. The head 105 is fixed to the gimbals tongue 308 with use of an epoxy resin of low elasticity. A limiter tab 307 for restricting the motion of the gimbals is formed at a rear end portion of the gimbals tongue 308. The gimbals tongue 308 is supported at one point by a dimple (not shown) of the beam portion 304. The gimbals 301 can be welded to the beam portion 304 by laser spot welding. The front portion of the gimbals 301 is not welded but is in a free condition. The gimbals tongue 308 is kept urged against the dimple by an elastic force of the gimbals 301. The gimbals tongue 308 permits the head 105 to pivot in pitching or rolling direction, thereby absorbing axial run-out of the magnetic disk 101 and also absorbing tilting of the assembly, and can exhibit a high follow-up performance for tracking of the magnetic disk 101.

A wiring structure portion 230 is formed contiguously to the gimbals 301 and extends from an end portion of the gimbals. A conductor wiring is formed on the gimbals 301. The conductor wiring is connected to the write element and/or the read element on the head 105. A description will now be given of the wiring structure on the gimbals 301. An insulating polyimide layer is formed on a stainless steel layer as a base of the gimbals 301. A conductor layer is formed of copper on the insulating polyimide layer and a protective polyimide layer is formed thereon. The wiring structure on the gimbals 301 can be formed by the known photolithography-etching technique. One end of the conductor layer is connected to a thin film element on the head 105 to effect signal transmission between the thin film element and an external circuit.

The wiring structure portion 230 extends from a side portion of the gimbals 301 on the side opposite a rotating shaft of the magnetic disk 101. The wiring structure portion 230 thus extending from the gimbals 301 further extends toward the pivot shaft 107 (the rear side of the actuator) along the load beam 302 and a side portion of the arm 111 (a side portion on the side opposite the center of the magnetic disk 101). A part of the wiring structure portion 230 is welded to the base portion 305 by spot welding. The wiring structure portion 230 is formed integrally with the gimbals 301. Like the wiring structure on the gimbals 301, the wiring structure portion 230 is constituted by a stainless steel layer as a base, an insulating polyimide layer on the stainless steel layer, a conductor layer on the insulating polyimide layer, and a protective polyimide layer. The constituent layers of the wiring structure portion 230 are formed contiguously to corresponding layers in the wiring structure on the gimbals 301. For the protective layer formed for protecting the surface of the conductor layer, such a resin layer as polyimide layer may be substituted by a gold-plated layer.

A tab 231 which is a convex portion for connection with FPC 210 is formed at the rear end (pivot shaft-side end) of the wiring structure portion 230. The width (length in the transverse direction of the arm upper surface) of the tab 231 is made larger than that of the wiring structure portion located between the tab 231 and the end portion of the gimbals 301. On a lower surface (the surface opposite the arm) of the tab 231 there are formed plural pads for soldering to FPC 210, which pads are connected to wirings in the wiring structure portion 230. Since the width of the tab 231 in the wiring structure portion is large, it is possible to effect the connection with FPC 210 effectively. An aperture 232 is formed on the gimbals 301 side of the tab 231. The aperture 232 is utilized for positioning in the manufacture of the head gimbals assembly 300.

Figure 4:
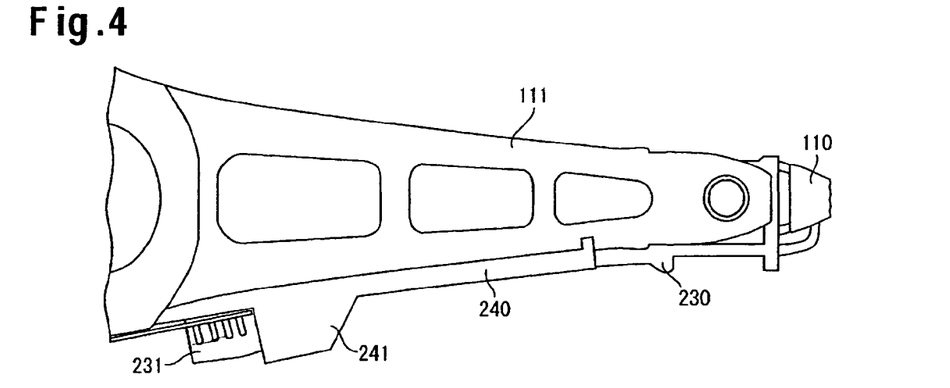
FIG. 4 is a plan view showing a partial construction of the actuator in the embodiment.

As shown in FIG. 2, the wiring structure portion 230 is inserted into a slit (concave portion) formed in the support portion 240 which is fixed to a side portion of the arm 111. Since the wiring structure portion 230 is thus disposed within the slit, it is possible to suppress fluttering (fluttering phenomenon) of the wiring structure portion which is induced by an air current created with rotation of the magnetic disk 101 and hence possible to improve the positioning accuracy for the head 105. FIG. 4 is a plan view as seen from the actuator pivot shaft 107 side, showing a partial construction of the head gimbals assembly 300, which assembly corresponds, for example, to the head gimbals assembly 300 located at the second stage from the top.

As shown in FIG. 4, the wiring structure portion 230 is formed contiguously to the suspension 110 and extends from the suspension toward the pivot shaft along a side portion of the arm 111. The support portion 240 supports the wiring structure portion 230 on the side facing the magnetic disk 101. The wiring structure portion 230 is supported within the slit in such a manner that its surface with a conductor wiring layer formed thereon faces in the direction along the pivot shaft 107. In particular, the support portion 240 has a convex wall portion 241 which overlaps the surface of the tab 231 facing the magnetic disk 101, the tab 231 being formed at the pivot shaft-side (FPC-side) end of the wiring structure portion 230. When seen from the actuator pivot shaft 107 side, the convex wall portion 241 covers at least a part of the tab 231. As shown in FIG. 4, it is preferable that the convex wall portion 241 cover a front end portion of the surface of the tab 231 facing the magnetic disk 101 and that the convex wall portion 241 overlap the tab 231 so as not to allow exposure of the aperture 232 formed in the tab 231. According to this construction it is possible to effectively suppress oscillation of the tab 231 caused by an air current.

The rear end side (pivot shaft 107 side) of the tab 231 is exposed without being covered with the convex wall portion 241 in order to permit connection between the tab 231 and the convex portions 212 of FPC. The convex wall portion 241 has a first side extending away from the side portion of the arm 111 while retracting from the front side (suspension 110 side), a second side extending in the longitudinal direction of the arm 111 while crossing the first side, and a third side extending from the second side toward the side portion of the arm while crossing the second side nearly perpendicularly. The front end-side length of the convex wall portion 241 is smaller than the arm 111-side length thereof, whereby it is possible to easily effect molding of the support portion 240 having the convex wall portion 241.

Figure 5:
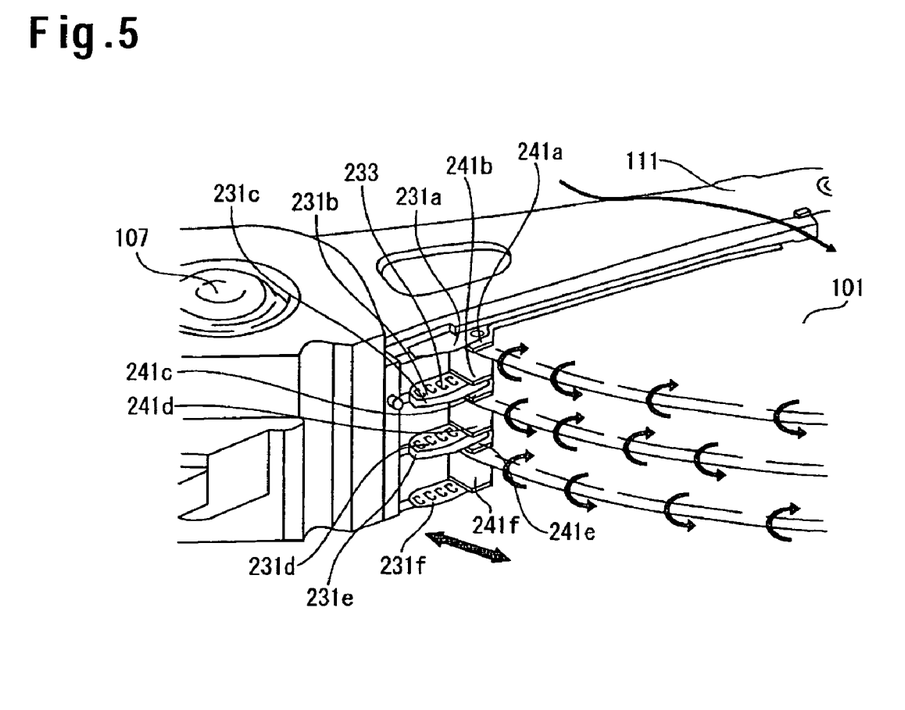
FIG. 5 is a diagram showing a relation between a vertical air current created with rotation of a magnetic disk and the construction of the actuator in the embodiment.

FIG. 5 illustrates in what manner the fluttering phenomenon is suppressed by the support portion. In FIG. 5, the FPC 210 to which the tab 231 of each wiring structure portion 230 is connected is not shown. In the same figure, numeral 233 denotes a pad formed on the tab. For ease and clarification of explanation, only some tabs are illustrated. As noted earlier, with rotation of the magnetic disk 101, an air current is created in the vertical direction (in the rotational axis direction of the magnetic disk) at an end portion of the magnetic disk 101, in addition to the air current created over the magnetic disk. In the case where plural magnetic disks 101 are stacked, air currents created in the circumferential direction over the magnetic disks are not uniform, and air currents created above and below one and same magnetic disk 101 are not the same. Consequently, a pressure difference occurs between above and below of each magnetic disk 101 and a curved air flow is induced between above and below of the magnetic disk.

In this embodiment, the support portion 240, which is disposed along a side portion of each arm 111 and which supports the wiring structure portion 230, has the convex wall portion 241 which covers the tab 231 of the wiring structure portion 230. The support portion 240 is fixed to each arm 111. The tab 231 is disposed on the side of the convex wall portion 241 facing the magnetic disk 101. Further, the tab 231 is disposed between convex wall portions 241 of one support portion 240. For example, a convex wall portion 241a covers a tab 231a, convex wall portions 241b and 241c cover tabs 231b and 231c, respectively, convex wall portions 241d and 241e cover tabs 231d and 231e, respectively, and a convex wall portion 241f covers a tab 231f.

Each convex wall portion 241 is formed so as to cover at least a part of the surface of the tab 231 in each wiring structure portion facing the magnetic disk 101. In particular, it is preferable that the convex wall portion 241 cover the tab 231 so as not to allow exposure of the magnetic disk-side end portion (front end portion) of the tab 231 or so as not to allow exposure of the positioning aperture 232 formed in the tab. Since the air current in the vertical direction is not large in the vicinity of the end portion of the magnetic disk and since the magnetic disk-side end portion of the tab 231 is not exposed on the side facing the magnetic disk 101, it is possible to suppress the occurrence of fluttering of the wiring structure portion 230 effectively. It is preferable that the width [length in the direction (in the transverse direction of the arm) perpendicular to the longitudinal direction of the arm] of the convex wall portion 241 which covers the tab 231 be not smaller than the width of the tab 231. Consequently, the end portion of the tab 231 on the side opposite to the arm 111 is not exposed from the convex wall portion 241 in the radial direction of the magnetic disk, so that it is possible to effectively suppress the oscillation of the tab 231 and that of the wiring structure portion 230 which can be induced by an air current. The tab 231 and the convex wall portion 241 overlap each other to cover the tab against an air current, so that, particularly when the actuator 106 accesses a track present on the inner periphery side of the magnetic disk 101, it is possible to effectively suppress oscillation of the wiring structure portion 230 caused by a vertical air current.

Figure 6:
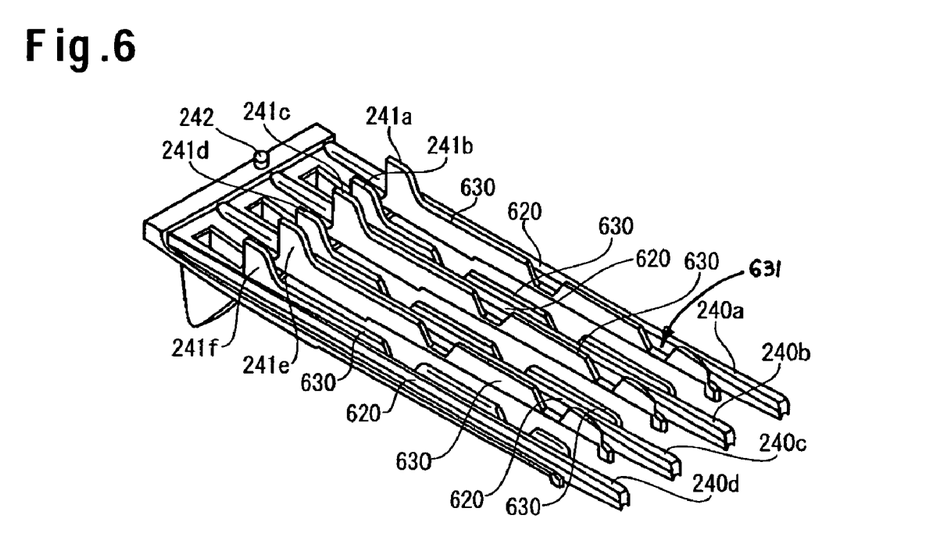
FIG. 6 is a perspective view showing the construction of support portions in the embodiment.
Figure 7:
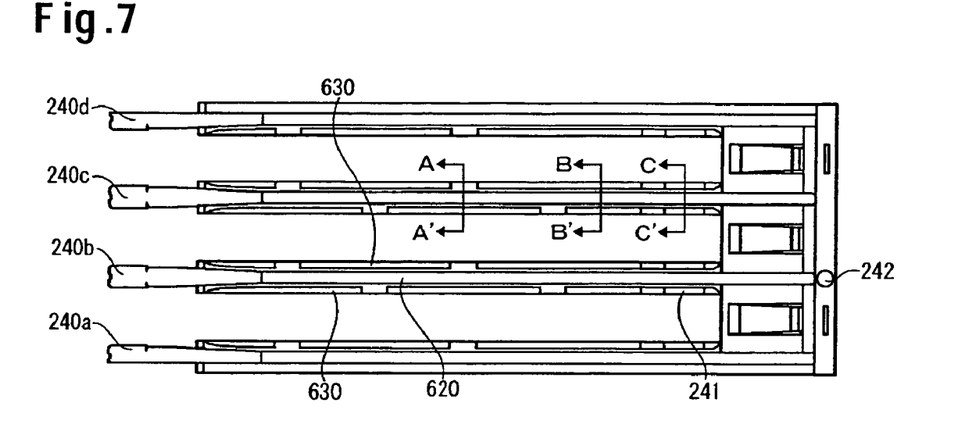
FIG. 7 is a side view showing the construction of support portions in the embodiment.

FIGS. 6 and 7 illustrate the construction of the support portions 240, of which FIG. 6 is a perspective view showing the construction of the support portions 240 and FIG. 7 is a side view showing the construction of the support portions 240 as seen from the slit side of the support portions (the side of the support portions 240 opposite the arms 111). The support portions 240 fixed respectively to the arms 111 are formed integrally. The support portions 240 are preferably formed of a resin material and are fixed to the arms 111 using an adhesive or the like. If the support portions 240 is formed with use of a resin material, it is possible to easily form the support portions 240 which have a complicated shape. Moreover, it is possible to suppress the generation of dust caused by contact between the metallic layer of the wiring structure portion 230 and the support portion 240.

Each support portion 240 has plural walls extending longitudinally of each arm 111. The walls are formed at a predetermined spacing and a slit (concave portion) for accommodating the wiring structure portion 230 is formed between the walls. In the illustrated example, each support portion 240 has a longitudinally extending central wall 620 and a longitudinally extending outer wall(s) 630 formed on one or both sides of the central wall, with a slit being formed between the central wall 620 and the outer wall(s) 630. The width (length in the slit depth direction) of each outer wall 630 is larger than the width of the central wall 620.

On the rear side (pivot shaft side) of each outer wall 630 there is formed a convex wall portion 241 wider than other convex portions of the outer wall 630. Each outer wall 630 is provided with concave portions (recesses) 631 intermittently in the longitudinal direction. Since each outer wall 630 has such concave portions, it is possible to enhance the strength of a mold used in resin molding. The concave portions of the outer wall 630 are formed at predetermined intervals, but are not formed at a position adjacent or near the convex wall portion 241 (an adjacent position on the front side of the actuator 106). Thus, a convex wall portion which constitutes the outer wall is formed contiguously to the convex wall portion 241, so that when the actuator 106 accesses a track present on the inner periphery side of the magnetic disk, it is possible to prevent the wiring structure portion 230 from being exposed, at a position deviated from the upper surface of the magnetic disk 101, to a vertical air current created at an end portion of the magnetic disk and hence possible to suppress the occurrence of the fluttering phenomenon effectively. The support portion 240a or 240d formed at the top or bottom stage has one slit for accommodating one wiring structure portion 230 and has an outer wall 630 on the side facing the magnetic disk 101, not having an outer wall 630 on the opposite side.

Other intermediate support portions 240b and 240c are each provided with two slits for accommodating two wiring structure portions 230 associated with two suspensions 110 which are connected to both upper and lower surfaces of the arm, and further provided with one central wall 620 and two outer walls 630. The concave portions in the outer walls 630 of the support portions 240 are formed at longitudinally offset positions so as not to overlap one another, whereby the oscillation of each wiring structure portion 230 caused by an air current, which can be developed in the presence of the concave portions, can be suppressed effectively. A pin 242 for engagement with FPC 210 is provided at an end portion on the rear side (the pivot shaft 107 side) of the support portions 240. The pin 242 when engaged with a concave portion of the FPC 210 can contribute to positioning of the FPC.

Figure 8:
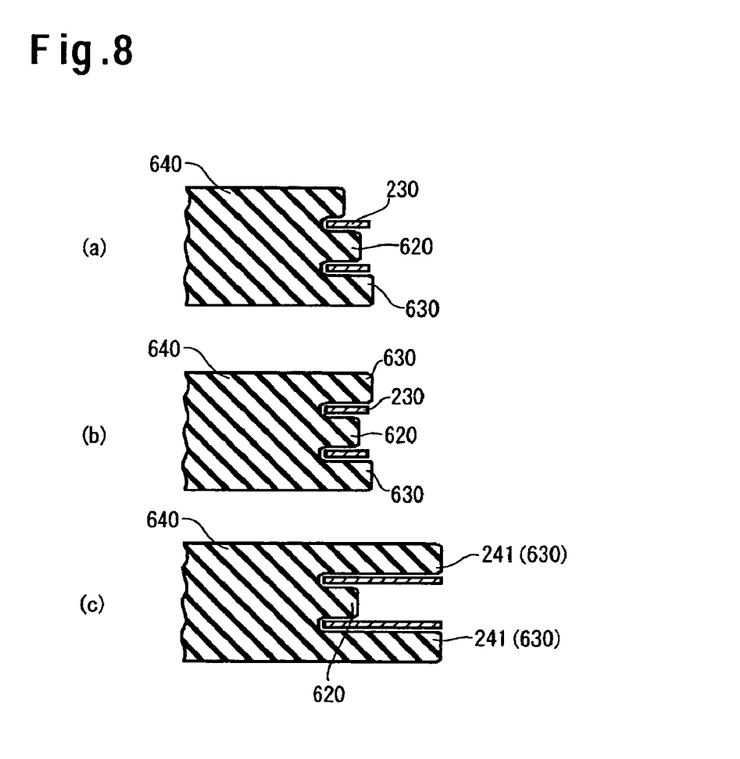
FIG. 8 is a side view showing the construction of support portions in the embodiment.

FIG. 8 is a sectional view for explaining the constructions of portions indicated with arrows AA', BB' and CC' in FIG. 7, showing a state in which wiring structure portions 230 are inserted into slits. FIGS. 8(a), 8(b) and 8(c) correspond to AA', BB', and CC', respectively, of which FIG. 8(a) shows a portion where a concave portion and a convex portion in outer walls are opposed to each other, FIG. 8(b) shows a portion where convex portions in outer walls 630 are opposed to each other, and FIG. 8(c) shows a portion where convex wall portions 241 in outer walls 630 are opposed to each other. In FIG. 8, a state is shown in which wiring structure portions 230 are disposed in one of the intermediate support portions 240b and 240c. As shown in the same figure, the central and outer walls 620, 630 are rendered integral with each other through a base wall 640 which is formed in a direction perpendicular to the central and outer walls. The outer walls 630 and the central wall 620 project from the base wall 640, and the base wall 640 form slit bottoms. The thickness (length in the direction of the pivot shaft 107) of each wiring structure portion 230 is substantially equal to or substantially smaller than the slit width (length in the pivot shaft direction). In this embodiment, from the standpoint of manufacturing working efficiency, each wiring structure portion 230 is merely inserted into the associated slit. However, the wiring structure portion 230 may be fixed using a fixing member, and a convex portion may be formed within the slit to hold the wiring structure portion 230 grippingly.

Figure 9:
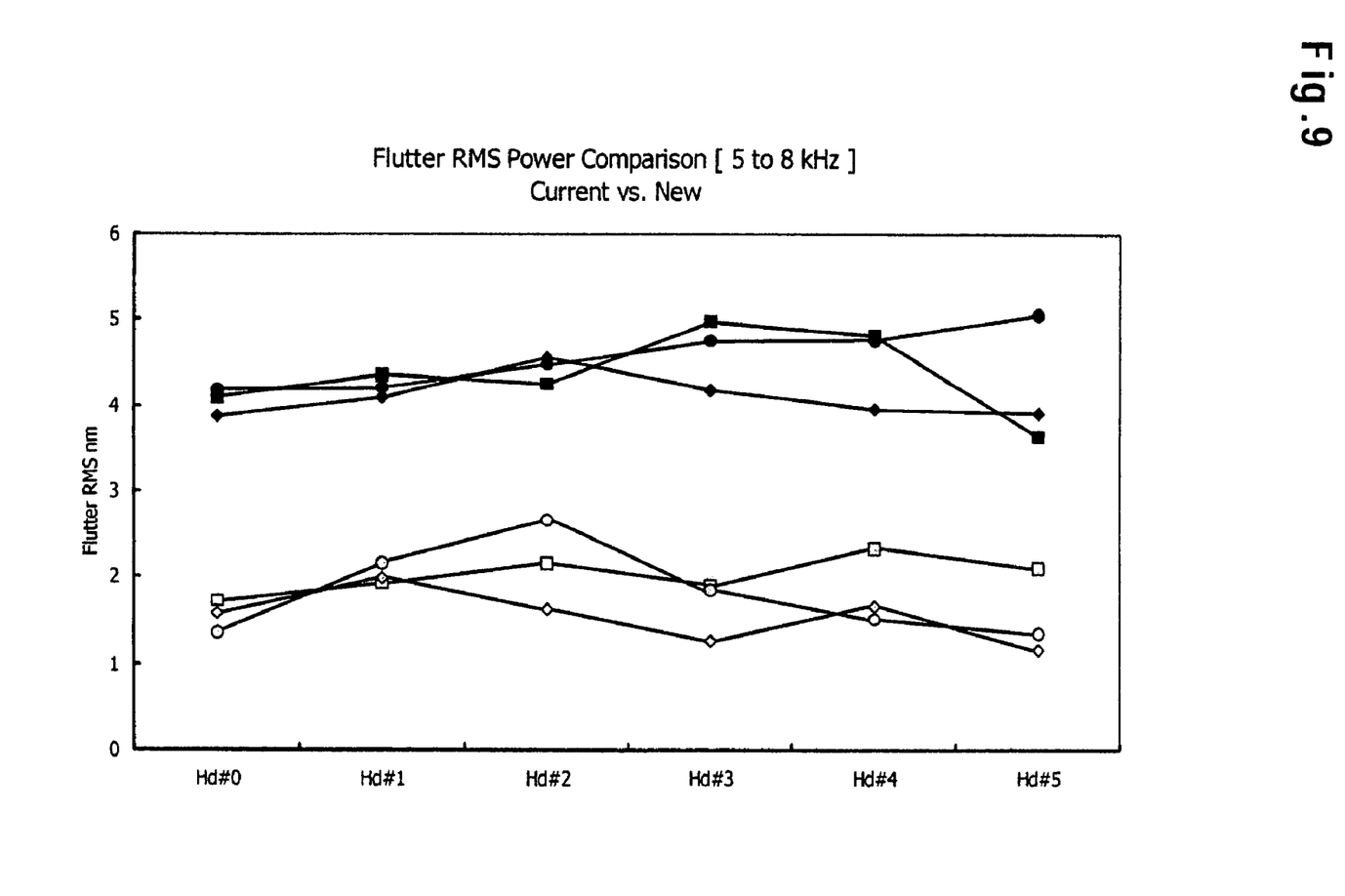
FIG. 9 is a graph showing a comparison between actuators according to the present embodiment and conventional actuators with respect to flutter quantity of each wiring structure portion.

FIG. 9 shows a comparison between hard disk drives to which the present embodiment is applied and conventional hard disk drives with respect to fluttering of wiring structure portions. In the same figure, flutter quantity is plotted along Y axis, while the number (head number (Hd)) of each of fabricated hard disk drives is plotted along X axis. With respect to the hard disk drives of the illustrated Hd numbers there were provided three hard disk drives equipped with actuators of conventional structures and three hard disk drives equipped with actuators according to the present embodiment, which were then measured for flutter quantity. In the graph of FIG. 9, the three upper lines represent the conventional hard disk drives, while the three lower lines represent the hard disk drives according to the present embodiment. The measurement of flutter quantity was conducted with respect to 5 to 8 kHz frequency. As is seen from FIG. 9, the fluttering of wiring structure portions can be reduced to half or even lower.

Figure 10:
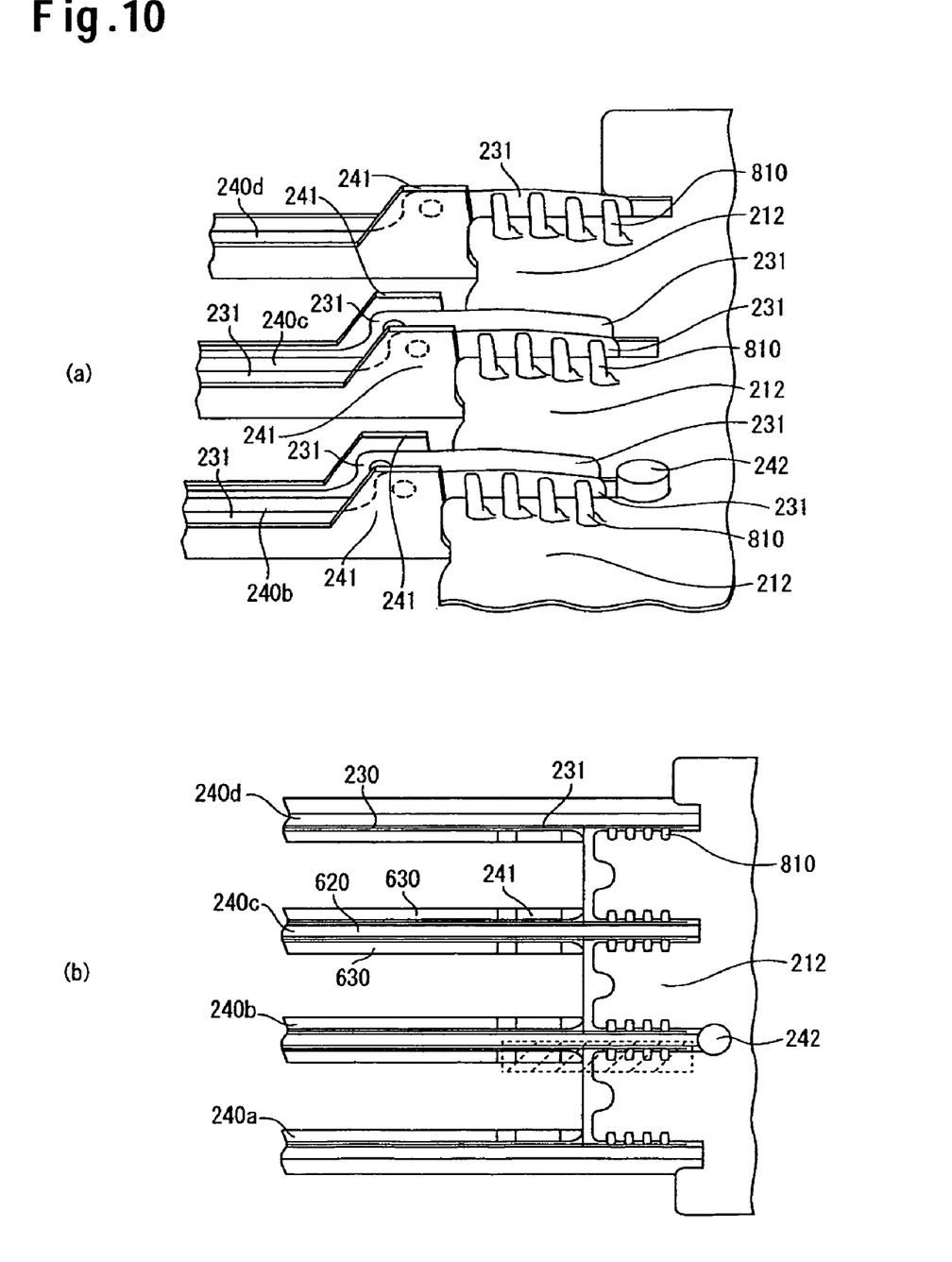
FIG. 10 illustrates connections between wiring structure portions and FPC in the embodiment.

FIG. 10 illustrates a state of connection between tabs 231 of wiring structure portions and convex portions 212 of FPC. Pads formed at ends of the FPC convex portions 212 and pads formed on surfaces of the tabs 231 opposed to the convex portions 212 are connected together by soldering to form connections 810. Tabs 231 of two wiring structure portions supported by one support portion 240 are inserted between adjacent FPC convex portions 212, and pads formed on the surfaces of the tabs 231 opposed to the convex portions 212 and pads formed at corresponding ends of the FPC convex portions 212 are connected together by soldering.

Four pads of the tab 231 in each wiring structure portion and four pads of each FPC convex portion are welded together by laser spot welding. Typically, in the laser spot welding, four pads are welded simultaneously by the radiation of a laser beam. For example, four pads are included in a generally square spot of a laser beam. At this time, from the standpoint of precision in spot welding, the spot area may be set larger than the area which includes four pads. In the case where the positioning pin 242 is formed as in this embodiment, it is preferable that a laser beam be radiated while being shifted to the support portion side (the front end side of the actuator), in order to avoid melting of the positioning pin due to laser radiation. Therefore, a part of the laser beam is radiated to a part of the support portion 240, especially to the convex wall portion 241 which covers the tab 231 of the wiring structure portion.

The conventional support portion 240 has been formed using a black color resin. In this connection, the present inventors found out that the support portion 240 irradiated with a laser beam at the time of welding absorbed the energy of the laser beam and melted with heat. In particular, due to melting of the convex wall portion 241 which covers the tab 231, it becomes virtually impossible to appropriately suppress the fluttering phenomenon caused by an air current perpendicular to the magnetic disk. The present inventors found out that, if an appropriate color of resin material for the support portion 240 is selected, melting of the support portion 240 could be suppressed even under the radiation of a laser beam for welding.

The support portion 240 is formed with use of a resin material of a color which substantially transmits or reflects light having a wavelength used in laser welding (including visible light and other wavelengths), it is possible to effectively suppress melting of the support portion 240 in laser beam radiation. Preferably, the support portion 240 is transparent or white. The word "transparent" as referred to herein covers both colorless transparency and colored transparency. The colorless transparency is also treated herein as one color of resin material. Colored transparency is preferred as the color of the support portion 240. If the support portion 240 is colored transparent, the work for inserting the wiring support portion 230 into the slit formed in the support portion 240 can be done efficiently in the manufacturing process. This is because the support portion is colored transparent and therefore a worker can easily check the position of slit and the position where the wiring structure portion 230 is to be disposed.

As the resin material of the support portion 240, a suitable material is selected from the standpoint of moldability or heat resistance. For example, a colored, transparent polyether imide resin is employable as a preferred material. From the standpoint of preventing melting of the support portion 240, it is not necessary for the whole of the support portion 240 to have a specific color. Only the portion subjected to laser beam irradiation or only the convex portion 241 that covers the wiring structure tab 231 may be formed using a specific color. Likewise, from the standpoint of preventing melting of the support portion 240, such a resin material having a specific color as referred to above may be used for forming a support portion 240 not having the convex wall portion 241 that is for covering the tab 231.

Instead of the support portion 240 formed of a resin material, a slit may be formed in a side portion of the metallic arm 111 and the wiring structure portion 230 may be inserted therein, whereby it is possible to suppress the occurrence of fluttering of the wiring support portion 230. Also in such a support portion integral with the arm there is formed a convex wall portion 241 which covers the tab 231 of the wiring support portion 230, as described above. The actuator structure according to the present invention is not limited to the stacked structure of plural head gimbals assemblies, but may be applied to an actuator having one head gimbals assembly. The present invention is applicable to not only a magnetic storage device but also other types of storage devices.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A data storage device comprising a storage disk which stores data and which is rotatable, a head adapted to access a storage area of said storage disk, and an actuator adapted to hold said head and pivot about a pivot shaft for moving said head, said actuator comprising:
a wiring structure portion extending along a side portion of said actuator and configured to perform signal transmission for said head; and
a wiring structure support portion disposed in the side portion of said actuator so as to support said wiring structure portion;
wherein said wiring structure portion has a convex portion formed on said pivot shaft side and projecting sideways of said actuator, and
wherein said wiring structure support portion has a convex wall portion projecting sideways of said actuator and overlapping said convex portion so as to protect the convex portion from an air current in the vicinity of an end portion of said storage disk,
wherein said wiring structure support portion has a first wall portion projecting sideways of said actuator and formed along the side portion of said actuator and a second wall portion projecting sideways of said actuator and formed along the side portion of said actuator, and said wiring structure portion is disposed between said first and second wall portions, and
wherein said first wall portion has a different shape from said second wall portion.

2. A data storage device according to claim 1, wherein said convex wall portion overlaps a front end portion of said convex portion.

3. A data storage device according to claim 1, wherein said convex wall portion is formed in said first wall portion and the width of said convex wall portion in a transverse direction of said actuator is larger than the width of the other portion of the first wall portion in the transverse direction of said actuator.

4. A data storage device according to claim 1, wherein said convex wall portion is formed in said first wall portion, and said first wall portion has a plurality of concave portions formed spacedly.

5. A data storage device according to claim 4, wherein, in said first wall portion, the concave portion adjacent to said convex wall portion on a front side of said actuator is formed at a predetermined spacing from the convex wall portion.

6. A data storage device according to claim 1, further comprising a second wiring structure portion connected to said wiring structure portion in said convex portion, wherein said convex portion has a connecting portion connected to said second wiring structure portion, said connecting portion being exposed to the outside of said convex wall portion.

7. A data storage device according to claim 6, wherein said connecting portion is connected to said second wiring structure portion through radiation of a laser beam, and said convex wall portion is formed in a color which substantially reflects and/or transmits the laser beam used in said laser beam radiation.

8. A data storage device according to claim 1, wherein, in the portion where said convex wall portion and said convex portion overlap each other, the width of the convex wall portion in a transverse direction of said actuator is larger than the width of the convex portion in the same direction.

9. A data storage device according to claim 1, wherein said convex portion is provided with an aperture, and said convex wall portion is formed so as to overlap said aperture.

10. A data storage device comprising a storage disk which stores data and which is rotatable, a head adapted to access a storage area of said storage disk, and an actuator adapted to hold said head and pivot about a pivot shaft for moving said head, said actuator comprising:
a wiring structure portion extending along a side portion of said actuator and configured to perform signal transmission for said head; and
a wiring structure support portion disposed in the side portion of said actuator so as to support said wiring structure portion;
wherein said wiring structure portion has a convex portion formed on said pivot shaft side and projecting sideways of said actuator,
wherein said wiring structure support portion has a convex wall portion projecting sideways of said actuator and overlapping said convex portion so as to protect the convex portion from an air current in the vicinity of an end portion of said storage disk, and
a second wiring structure portion connected to said wiring structure portion, wherein said convex portion has a connecting portion connected to said second wiring structure portion, and said convex wall portion is transparent or white.

11. A data storage device comprising:
a storage disk which stores data and which is rotatable;
a head configured to access a storage area of said storage disk;
a suspension which holds said head;
an arm connected to said suspension;
a drive mechanism configured to pivot said arm and said suspension;
a first wiring structure portion configured to perform signal transmission for said head, said first wiring structure portion being formed contiguously to said suspension and extending toward said drive mechanism side along a side portion of said arm;
a wiring structure support portion disposed in the side portion of said arm; and
a second wiring structure portion connected to said first wiring structure portion on said drive mechanism side;
wherein said wiring structure support portion includes a first wall portion projecting sideways of said arm and formed along the side portion of the arm and a second wall portion projecting sideways of said arm and formed along the side portion of the arm,
wherein said first wiring structure portion is disposed between said first and second wall portions,
wherein said first wiring structure portion has a convex portion projecting sideways of said arm and connected to said second wiring structure portion,
wherein said first wall portion has a convex wall portion which overlaps said convex portion on the side facing said storage disk, and
wherein said wiring structure support portion is formed of a transparent or white resin.

12. A data storage device comprising:
a storage disk which stores data and which is rotatable;
a head configured to access a storage area of said storage disk;
a suspension which holds said head;
an arm connected to said suspension;
a drive mechanism configured to pivot said arm and said suspension;
a first wiring structure portion configured to perform signal transmission for said head, said first wiring structure portion being formed contiguously to said suspension and extending toward said drive mechanism side along a side portion of said arm;

a wiring structure support portion disposed in the side portion of said arm; and a second wiring structure portion connected to said first wiring structure portion on said drive mechanism side;

wherein said wiring structure support portion includes a first wall portion projecting sideways of said arm and formed along the side portion of the arm and a second wall portion projecting sideways of said arm and formed along the side portion of the arm, wherein said first wiring structure portion is disposed between said first and second wall portions, wherein said first wiring structure portion has a convex portion projecting sideways of said arm and connected to said second wiring structure portion, wherein said first wall portion has a convex wall portion which overlaps said convex portion on the side facing said storage disk, and wherein said first wall portion has a different shape from said second wall portion.

13. A data storage device according to claim 12, wherein said convex portion has a connecting portion connected to said second wiring structure portion, said connecting portion being exposed to the outside of said convex wall portion.

14. A data storage device according to claim 12, wherein, in the portion where said convex wall portion and said convex portion overlap each other, the width of the convex wall portion in a transverse direction of said arm is larger than the width of the convex portion in the same direction.

15. A data storage device according to claim 12, wherein said convex wall portion overlaps a front end portion of said convex portion.

* * * * *